US012622439B2

(12) United States Patent　　　　(10) Patent No.:　US 12,622,439 B2
McGarel et al.　　　　　　　　　　(45) Date of Patent:　　May 12, 2026

(54) EDIBLE CELLULOSIC CASINGS AND COMPOSITIONS, AND METHODS OF FORMATION

(71) Applicant: Viskase Companies, Inc., Lombard, IL (US)

(72) Inventors: Owen J. McGarel, Naperville, IL (US); Myron D. Nicholson, Lemont, IL (US); Chris L. Williams, Knoxville, TN (US)

(73) Assignee: Viskase Companies, Inc., Lombard, IL (US)

( * ) Notice: Subject to any disclaimer, the term of this patent is extended or adjusted under 35 U.S.C. 154(b) by 937 days.

(21) Appl. No.: 17/452,711

(22) Filed: Oct. 28, 2021

(65) Prior Publication Data

US 2022/0132871 A1　　May 5, 2022

Related U.S. Application Data

(60) Provisional application No. 63/108,134, filed on Oct. 30, 2020.

(51) Int. Cl.
A22C 13/00　　　　(2006.01)
(52) U.S. Cl.
CPC ...... A22C 13/00 (2013.01); A22C 2013/0096 (2013.01)
(58) Field of Classification Search
CPC ....... A22C 13/00; A22C 13/0013; C08L 1/02; C08L 5/04; C08L 3/02; C08L 3/06; C08L 5/08; C08L 5/06; C08L 5/00; C08B 16/00
See application file for complete search history.

(56) References Cited

U.S. PATENT DOCUMENTS

| | | | |
|---|---|---|---|
| 2,179,181 | A | 11/1939 | Charles et al. |
| 3,427,168 | A | 2/1969 | Turbak et al. |
| 3,447,939 | A | 6/1969 | Johnson |
| 3,682,661 | A | 8/1972 | Turbak |
| 4,145,532 | A | 3/1979 | Franks et al. |
| 4,426,228 | A | 1/1984 | Brandner et al. |
| 4,994,285 | A | 2/1991 | Hisano et al. |
| 5,096,754 | A | 3/1992 | Hammer et al. |
| 5,277,857 | A | 1/1994 | Nicholson et al. |
| 5,451,364 | A | 9/1995 | Ducharme et al. |
| H1592 | H | 9/1996 | Nicholson |
| 5,597,587 | A | 1/1997 | Nicholson et al. |
| 5,658,524 | A | 8/1997 | Portnoy et al. |
| 5,702,783 | A | 12/1997 | Nicholson et al. |
| 5,744,251 | A | 4/1998 | Ducharme et al. |
| 5,811,162 | A | 9/1998 | Hammer et al. |
| 5,820,934 | A | 10/1998 | Basfeld |
| 5,942,167 | A | 8/1999 | Edmund |
| 5,962,053 | A | 10/1999 | Frederick |
| 6,033,618 | A | 3/2000 | Gord et al. |
| 6,279,737 | B1 | 8/2001 | Long et al. |
| 6,395,356 | B1 | 5/2002 | Wielockx et al. |
| 6,547,999 | B1 | 4/2003 | Ducharme et al. |
| 6,558,719 | B1 | 5/2003 | Blumenberg et al. |
| 6,565,796 | B1 | 5/2003 | McGarel et al. |
| 6,730,340 | B1 | 5/2004 | Macquarrie et al. |
| 7,108,907 | B1 | 9/2006 | Yamane et al. |
| 7,655,165 | B2 | 2/2010 | Weibel |
| 7,854,976 | B2 | 12/2010 | Hammer et al. |
| 8,728,561 | B2 | 5/2014 | MacQuarrie |
| 2004/0146668 | A1 | 7/2004 | Gord et al. |
| 2004/0166209 | A1 | 8/2004 | Gord et al. |
| 2005/0181020 | A1 | 8/2005 | Reg |
| 2006/0004193 | A1 | 1/2006 | Muller et al. |
| 2006/0153953 | A1 | 7/2006 | Gord et al. |
| 2008/0233246 | A1 | 9/2008 | Hammer et al. |
| 2009/0280221 | A1 | 11/2009 | MacQuarrie |
| 2012/0321752 | A1 | 12/2012 | Van De Nieuwelaar et al. |
| 2017/0042167 | A1 | 2/2017 | MacQuarrie |
| 2017/0055558 | A1 | 3/2017 | Ziemes et al. |
| 2019/0313655 | A1 | 10/2019 | Nicholson et al. |

FOREIGN PATENT DOCUMENTS

| | | |
|---|---|---|
| EP | 2482668 A1 | 8/2012 |
| WO | 2004/058862 A1 | 7/2004 |
| WO | 2011/038479 A1 | 4/2011 |

OTHER PUBLICATIONS

European Communication pursuant to Article 94(3) EPC for European Application No. 21204611.4, dated Jul. 30, 2024, 4 pages.
Canadian Requisition by the Examiner for Canadian Application No. 3134985, dated Jan. 21, 2023, 5 pages.
Alanís-Lopez, et al., "Extrusion and Characterization of Thermoplastic Starch Sheets from "Macho" Banana", Journal of Food Science, vol. 76, No. 6, (Apr. 2011), pp. E465-E471.
Ascona Foods Group "Products" retrieved from https://www.asconafoods.com/products, retrieved on (Sep. 29, 2020), 3 pages.
Belyamani et al., "Production and characterization of sodium caseinate edible films made by blown-film extrusion", Journal of Food Engineering, vol. 121, (2014) Accepted Aug. 9, 2013, pp. 39-47.
Boyle et al., "Are All Meat Casings Edible?," Department of Animal Sciences and Industry, Kansas State University, (Jan. 1995), 1 page.
Cha et al., "Evaluation of Processes to Enhance Grain and Meat Coproducts", Journal of Food Process Engineering, vol. 23, Issue 5, (Jan. 30, 2007), pp. 353-371 (Abstract only).

(Continued)

*Primary Examiner* — Vera Stulii
(74) *Attorney, Agent, or Firm* — TraskBritt

(57)　　　　ABSTRACT

Edible cellulosic casings comprise cellulose and at least one modifier comprising at least one polysaccharide. The at least one modifier is substantially evenly distributed with the cellulose throughout a casing material of the edible cellulosic casing. A composition useful for an edible cellulosic casing comprises regenerated cellulose and at least one non-cellulose hydrophilic polysaccharide dispersed in the regenerated cellulose. The regenerated cellulose composes at least 50 wt. % of the composition. A method for forming an edible cellulosic casing comprises forming a cellulose solution and forming a modifier solution comprising at least one polysaccharide dissolved therein. The modifier and cellulose solutions are mixed to form a mixture from which the edible cellulosic casing is made. Edible cellulosic casings, as disclosed, may be consumed along with an encased foodstuff or other material for ingestion.

14 Claims, 1 Drawing Sheet

(56) References Cited

OTHER PUBLICATIONS

Chunfang et al., "Effects of Extruding Technological Parameters on in Vitro Protein Digestibility of Flaxseed", Transactions of the Chinese Society, (Accessed Oct. 25, 2021) 1 page.

Crowe et al., "Twin-Screw Extrusion Texturization of Extruded-Expelled Soybean Flour", Jaocs, vol. 78, No. 8, (Jul. 2001), pp. 781-786.

Day et al., "Functionality of Protein-Fortified Extrudates", Comprehensive Reviews in Food Science and Food Safety, vol. 12, (May 2013), pp. 546-564.

European Extended Search Report and Opinion for European Application No. 21204611.4, dated Mar. 24, 2022, 5 pages.

Glencross et al., "A comparison of the effect of diet extrusion or screw-press pelleting on the digestibility of grain protein products when fed to rainbow trout (*Oncorhynchus mykiss*)", Aquaculture, vol. 312, (2011) Accepted Dec. 16, 2010, pp. 154-161.

Guha et al., "Twin-screw Extrusion of Rice Flour Without a Die: Effect of Barrel Temperature and Screw Speed on Extrusion and Extrudate Characteristics", Journal of Food Engineering, vol. 32, (Apr. 1997), pp. 251-267.

Hermanutz et al., "Processing of Cellulose Using Ionic Liquids", Macromol. Mater. Eng., vol. 304, (Feb. 2019), pp. 1800450, 1-8.

Hernandez-Izquierdo et al., "Thermal Transitions and Extrusion of Glycerol-Plasticized Whey Protein Mixtures", Journal of Food Science, vol. 73, No. 4, (Feb. 2008), pp. E169-E175.

Hernandez-Izquierdo et al., "Thermal Transitions and Heat-Sealing of Glycerol-Plasticized Whey Protein Films", Packaging Technology and Science, vol. 22, Issue 5, (Jan. 20, 2009), pp. 255-260.

Hernandez-Izquierdo, V.M., "Thermal Transitions, Extrusion, and Heat-sealing of Whey Protein Edible Films", Dissertation preview, submitted in partial satisfaction of the requirements for the degree of Doctor of Philosophy in Biological and Agricultural Engineering in the Office of Graduate Studies of the University of California, (2007), 24 pages.

Ibanoglu et al., "In Vitro Protein Digestiblity and Content of Thiamin and Riboflavin in Extruded Tarhana, a Traditional Turkish Cereal Food", Food Chemistry, vol. 58, Issue 1-2, (Jan.-Feb. 1997), pp. 141-144 (Abstract only).

Indian Patent News, Innogel AG Receives Patent for Tough_Elastic Material Based on Starch, (May 25, 2011), available at https://www.proquest.com/docveiw/868381888/57597A1984F94130PQ/1, 2 pages.

JetNet, "Nutrafilm carrageenan film for Meat and Poultry Packaging", (Sep. 29, 2020), (available at https://www.jetnetcorp.com/nutrafilm.html, 1 page.

Jing et al., "Effects of twin-screw extrusion on soluble dietary fibre and physicochemical properties of soybean residue", Food Chemistry, vol. 138, (2013) Accepted Dec. 2, 2012, pp. 884-889.

Kong et al., "Development, Characterization and Stability Study of Value-Aded Extruded Salmon Snacks", Electronic Theses and Dissertations, (Date of Award -Dec. 2008), 2 pages.

Krishna et al., "Development of fish gelatin edible films using extrusion and compression molding", Journal of Food Engineering, vol. 108, (2012), pp. 337-344.

Li et al., "Evaluation of the prebiotic GroBiotic (Registered)—A and brewers yeast as dietary supplements for sub-adult hybrid striped bass (Morone chrysops*M. saxatilis) challenged in situ with *Mycobacterium marinum*", Aquaculture, vol. 248, (2005), pp. 197-205.

Li et al., "Extrusion processing and characterization of edible starch films with different amylose contents", Journal of Food Engineering, vol. 106, (Apr. 2011), pp. 95-101.

Liang et al., "Extrusion Cooking of Rapeseed Meal for Feeding Value Improvement", Applied Engineering in Agriculture, vol. 18, No. 3, (2002), pp. 325-330.

Liu et al., "A Preliminary Study on Antimicrobial Edible Films from Pectin and Other Food Hydrocolloids by Extrusion Method", Journal of Natural Fibers, vol. 5, No. 4, (Nov. 2008), pp. 366-382.

Luo et al., "Effect of Extrusion Cooking on in Vitro Digestibility of low Value Aquatic Protein", 2011 International Conference on Remote Sensing, Environment and Transportation Engineering, (2011), 2 pages.

Mohd et al., "Dissolution of Cellulose in Ionic Liquid: A Review", AIP Conference Proceedings, 1809, (Published online Feb. 24, 2017), 020035-1-020035-13.

Murphy et al., "Chemical composition and physical properties of extruded snacks containing crab-processing by-product", Journal of the Science of Food and Agriculture, vol. 83, (May 2003), pp. 1163-1167.

Nicholson et al., "Fllexibie nonwoven composites for food packaging", Reprinted from Toppi Journal, vol. 74, No. 5, May 1991, pp. 227-231.

Norajit et al., "Preparation and Properties of Antibacterial Alginate Films Incorporating Extruded White Ginseng Extract", Journal of Food Processing and Preservation, vol. 35, Issue 4, (Dec. 9, 2010), pp. 387-393.

Pastor-Cavada et al., "Effects of the addition of wild legumes (*Lathyrus annuus* and *Lathyrus clymenum*) on the physical and nutritional properties of extruded products based on whole corn and brown rice", Food Chemistry, vol. 128, (Mar. 31, 2011), pp. 961-967.

Reiser et al., "VEMAG cc215 Alginate Sausage Line", Accessed May 22, 2018, (available at http://www.reiser.com/sausage-alginate-cc215.php, 1 page.

Santillán-Moreno et al., "Physicochemical Characterization of Extruded Blends of Corn Starch-Whey Protein Concentrate-Agave tequilana Fiber", Food Bioprocess Technol., vol. 4, (2011) Accepted Jun. 9, 2009, pp. 797-808.

Shrestha et al., "Enzyme resistance and structural organization in extruded high amylose maize starch", Carbohydrate Polymers, vol. 80, (2010) Accepted Dec. 3, 2009, pp. 699-710.

Simelane et al., "Mechanical Properties of Whey Protein Isolate Based Edible Films as Affected by Meat Processing Conditions and Optimization of These Properties", Department of Food Science and Human Nutrition, 2003, 24 pages.

Singla, "Effect of Processing on Pinhão Seeds and Extrudability of Pinhão Flour," Thesis, Graduate School-New Brunswick, Rutgers, (Jan. 2011), available at https://rucore.libraries.rutgers.edu/rutgers-lib/31172/PDF/1/ (last accessed Oct. 26, 2020), 108 pages.

Sothornvit et al., "Tensile properties of compression-molded whey protein sheets: Determination of molding condition and glycerol-content effects and comparison with solution-cast films", Journal of Food Engineering, vol. 78, (2007) Accepted Dec. 1, 2005, pp. 855-860.

Stojceska et al., "Cauliflower by-products as a new source of dietary fibre, antioxidants and proteins in cereal based ready-to-eat expanded snacks", Journal of Food Engineering, vol. 87, (Jan. 2008), pp. 554-563.

Su et al., "Extrusion Processing of Starch Film", International Journal of Food Engineering, vol. 5, Issue 1, (Mar. 2009), 15 pages.

Ture et al., "Antimicrobial compression-moulded wheat gluten films containing potassium sorbate", Food Research International, vol. 45, (2012) Accepted Oct. 11, 2011, pp. 109-115.

Vodovotz et al., "Quantification and Characterization of Volatiles Evolved during Extrusion of Rice and Soy Flours", Biotechnol. Prog., vol. 16, (Feb. 2000) pp. 299-301.

Waramboi et al., "Influence of extrusion on expansion, functional and digestibility properties of whole sweetpotato flour", LWT—Food Science and Technology, vol. 59, (Jun. 2014), pp. 1136-1145.

Willberg-Keyrilainen et al., "Production of cellulose carbamate using urea-based deep eutectic solvents", Cellulose, (Aug. 2017), 11 pages.

Wirjosentono et al., "Oil Palm Fruit Bunch Filled Polypropylene Composites", International Journal of Polymeric Materials, vol. 53, No. 4, (Apr. 2004), pp. 295-306.

Yagci et al., "Effect of Incorporation of Various Food By-products on Some Nutritional Properties of Rice-based Extruded Foods", Food Science and Technology International OnlineFirst, (Dec. 2009), pp. 0001-0011.

Yong et al., "Weighing up whey fortification of foods: Implications for kinetics of starch digestion and estimated glycemic index of model high-protein-low-carbohydrate food systems", Carbohydrate Polymers, vol. 84, (2011) Accepted Nov. 9, 2010, pp. 162-172.

(56) References Cited

OTHER PUBLICATIONS

Zhang et al., "Alkali combined extrusion pretreatment of corn stover to enhance enzyme saccharification", Industrial Crops and Products, vol. 37, (2012) Accepted Dec. 4, 2011, pp. 352-357.
European Communication pursuant to Rule 114(2) EPC for European Application No. 21204611.4, dated Oct. 20, 2023, 63 pages.
European Communication pursuant to Rule 114(2) EPC for European Application No. 21204611.4, dated Feb. 27, 2025, 9 pages.

104

102
(108)

106

100

104

200

102 (108)

304

302

104

102
(108)

304

302

104

102
(108)

402

302

304

506

504

502

504

504

EDIBLE CELLULOSIC CASINGS AND COMPOSITIONS, AND METHODS OF FORMATION

CROSS-REFERENCE TO RELATED APPLICATION

This application claims the benefit, under 35 U.S.C. § 119(e) of U.S. Provisional Patent Application Ser. No. 63/108,134, filed Oct. 30, 2020, the disclosure of which is hereby incorporated in its entirety herein by this reference.

TECHNICAL FIELD

Embodiments of the application, in various embodiments, generally relate to edible food casings for sausages, hot dogs, other material for ingestion, and the like. More particularly, the application relates to edible food casings that are cellulose based (i.e., edible cellulosic casings) and to methods of making and using such food casings.

BACKGROUND

Foodstuff casings generally fall into one of four categories: natural casings, collagen casings, cellulosic casings, and polymeric casings. Both natural casings (e.g., formed from animal intestines) and collagen casings are derived from animals. For example, collagen casings, which are conventionally based on extracted and cross-linked collagen, are derived from animal hides. Being derived from animals, the manufacture of natural and collagen casings depends on availability of animal sources. Animal-derived casings can be more expensive to manufacture than non-animal-derived casings (e.g., cellulosic and polymeric casings) due to, for example, a limited supply of animal sources, which limited supply can become further limited upon animal disease outbreaks. And, animal-derived casings are generally not suitable for vegetarian and vegan consumers.

Conventional cellulosic and polymeric casings are typically derived from non-animal sources. However, conventionally, these types of casings are also generally indigestible by humans. For example, a casing consisting of only regenerated cellulose would likely be extremely tough such that biting into the casing may be very tough if not impossible. Therefore, cellulosic and polymeric casings have, conventionally, been considered non-edible. When used to encase foodstuffs (e.g., meat or other food emulsions) or other material for ingestion, conventional cellulosic and polymeric casings are removed (e.g., peeled) from cooked foodstuffs before the remainder of the foodstuffs are consumed.

Attempts have been made to formulate edible casings that are cellulosic or, more generally, not animal derived. However, formulating casings with appropriate strength to survive stuffing processes, but not so strong as to prevent a consumer from biting into the casing and breaking down the casing by chewing, has proved challenging. Adding to this challenge is the need for edible casings to adhere to the encased foodstuffs during cooking and during chewing. Other desired characteristics that can add to the challenge of formulating edible casings may include desired permeability or semi-permeability to, e.g., smoke and the desirability of cooked encased products maintaining an acceptable appearance and flavor. Moreover, it can be challenging to form edible and non-animal-derived casings in a manner that is cost effective, efficient, and yields a product of suitable quality.

BRIEF SUMMARY

According to at least some embodiments of the disclosure, an edible cellulosic casing comprises cellulose and at least one modifier. The at least one modifier comprises at least one polysaccharide. The at least one modifier is substantially evenly distributed with the cellulose throughout a casing material of the edible cellulosic casing.

In accordance with at least some embodiments of the disclosure, a composition useful for an edible cellulosic casing comprises regenerated cellulose and at least one non-cellulose hydrophilic polysaccharide dispersed in the regenerated cellulose. The regenerated cellulose composes at least 50 wt. % of the composition.

In at least some embodiments of the disclosure, a method for forming an edible cellulosic casing comprises forming a solution comprising cellulose, forming a modifier solution, and mixing the modifier solution into the solution comprising the cellulose. The modifier solution comprises at least one polysaccharide dissolved therein. Mixing the modifier solution into the solution that comprises the cellulose forms a mixture. An edible cellulosic casing material is formed from the mixture. The edible cellulosic casing material comprises the cellulose and the at least one polysaccharide. The cellulose comprises at least about 50 wt. % of the edible cellulosic casing material. The cellulose and the at least one polysaccharide are substantially evenly distributed throughout the edible cellulosic casing material.

DETAILED DESCRIPTION

Figures 1, 2, 3, 4, 5:
FIG. 1 is an elevational, perspective, schematic illustration of an edible cellulosic casing, according to embodiments of the disclosure, wherein the casing is configured as a tubular casing.
FIG. 2 is a perspective, schematic illustration of an edible cellulosic casing, according to embodiments of the disclosure, wherein the casing is a flat film casing, which may subsequently be reconfigured as the tubular casing of FIG. 1.
FIG. 3 is an enlarged, cross-sectional, elevational, schematic illustration of a casing material, such as a casing material of any one of the casings of FIG. 1 and FIG. 2, according to embodiments of the disclosure.
FIG. 4 is an enlarged, cross-sectional, elevational, schematic illustration of the casing material of FIG. 3 with an adhesion promoter adjacent a food-contact surface, which casing material and adhesion promoter may be included in any one of the casings of FIG. 1 and FIG. 2, according to embodiments of the disclosure.
FIG. 5 is an enlarged, cross-sectional, schematic illustration—in any of elevation, plan, or side view—of a portion of the casing material of FIG. 3 and/or FIG. 4, which casing material may be included in any one of the casings of FIG. 1 and FIG. 2, according to embodiments of the disclosure.

Disclosed are edible cellulosic casings and compositions of and methods for making and using such casings. In addition to cellulose, the material of the casing also comprises at least one "modifier" that includes at least one polysaccharide and, in some embodiments, at least one peptide. With the addition of the modifier(s) to the cellulose, the casing material is formulated to have sufficient strength to maintain its physical integrity during such rigorous processes as stuffing, cooking, and other manufacturing processes, but also sufficient structural vulnerability to exhibit adequate bite (e.g., "knack"), masticatability (e.g., "chewability"), casing-to-foodstuff adhesion, and permeability (e.g., to moisture, smoke, other flavorants). The composition of the casing material may be completely free of animal-derived components, such that the casings may be suitable for vegetarian or vegan consumers. The casings may be formed as tubular casings (e.g., seamless tubular casings) or as flat films for later sealing into tubular form.

As used herein, the term "seamless," when referring to a casing, refers to a casing that has the same or similar composition and structure along the circumference of the transverse cross-section of the casing. Contrarily, a casing that has a seam and is not "seamless" may include overlapping material layers and/or additional adhesive along one or more segments of the circumference of the transverse cross-section of the casing, which overlapping layers or additional adhesive may be the result of joining two longitudinal sides of what was previously a flat film, so as to form a cylinder.

As used herein, the terms "casing" and "film" may be used interchangeably and may include, e.g., a tubular casing (e.g., a seamless tubular casing, a seamed tubular casing) and/or a flat film casing (e.g., a casing in the form of a sheet). That which is referred to herein as a "casing" or as a "film" may otherwise be referred to in the art as "packaging," for example.

As used herein, the terms "cellulosic casing" and "cellulose-based casing" mean a casing that includes cellulose of at least 50 wt. % of the dry weight of the casing.

As used herein, the terms "weight percent," "weight percentage," and "wt. %" each refers to the percent, by weight, of the dry weight of the casing, unless otherwise indicated.

As used herein, the term "dry weight," when referring to the weight percentage of a component of the casing or of a subcomponent of a component of the casing, refers to the weight percentage of the casing or the component of the casing, respectively, once the casing has been formed into its completed, tubular or flat film form but before it encases a foodstuff. The "dry weight" may therefore refer to the weight of the casing or its indicated component prior to filling (e.g., stuffing) the casing and, at least in some embodiments, prior to application of any liquid-based coatings or solutions. Therefore, the "dry weight" may be the weight of the dry solids of the casing material and/or may be the weight of the casing material after extrusion but prior to application of a shining solution.

As used herein, the terms "shirr" and "shirring" mean and refer to a method of pleating (e.g., using a shirring mandrel) a long piece of casing material, such as a tubular casing material, into a much more compact tube called a "stick" or a "shined stick."

As used herein, the terms "deshirr" and "deshirring" mean and refer to a method of unpleating a stick (e.g., a shirred stick) of casing material.

As used herein, the term "shining solution" means and includes a solution applied to a casing material during the process of shining the casing material.

As used herein, the term "peptide" means and includes a short-chain compound of between about two and fifty amino acids linked by peptide bonds. A "peptide bond" is an amide type of covalent chemical bond linking two consecutive alpha-amino acids from a carbon atom (e.g., first carbon atom of a chain) of one alpha-amino acid and a nitrogen atom of another amino acid. Accordingly, at a peptide bond, one amino acid is covalently bonded to a neighboring amino acid via a —C—N—C— bonding chain sequence (wherein the C atoms are each from one of the neighboring amino acids). Peptides with amino acid chains of fewer than about ten or fifteen amino acids may be known as "oligopeptides," and these include dipeptides, tripeptides, and tetrapeptides. Peptides with amino acid chains of greater than about ten or fifteen amino acids —such as long, continuous, unbranched chains of up to about fifty amino acids—may be known as "polypeptides."

As used herein, the term "protein" means and includes a long-chain compound of more than fifty amino acids.

As used herein, the term "modifier" means and includes a composition component (e.g., an ingredient, additive, chemical, or other substance) formulated or otherwise configured to modify (e.g., alter) the characteristics of the composition that would otherwise be expected in the absence of the modifier. For example, a "modifier," added to a composition primarily comprising an ingredient that would be expected to exhibit material strength, may be a modifier that causes the structure formed from such composition to exhibit less material strength. Accordingly, a "modifier" may enhance or diminish the properties that would otherwise be expected in the absence of the inclusion of the modifier.

As used herein, the terms "about" and "approximately," when either is used in reference to a numerical value for a particular parameter, are inclusive of the numerical value and a degree of variance from the numerical value that one of ordinary skill in the art would understand is within acceptable tolerances for the particular parameter. For example, "about" or "approximately," in reference to a numerical value, may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "substantially," when referring to a parameter, property, or condition, means and includes the parameter, property, or condition being equal to or within a degree of variance from a given value such that one of ordinary skill in the art would understand such given value to be acceptably met, such as within acceptable manufacturing tolerances. By way of example, depending on the particular parameter, property, or condition that is substantially met, the parameter, property, or condition may be "substantially" a given value when the value is at least 90.0% met, at least 95.0% met, at least 99.0% met, or even at least 99.9% met.

As used herein, reference to an element as being "on" another element means and includes the element being directly on top of, adjacent to (e.g., laterally adjacent to, vertically adjacent to), underneath, or in direct contact with the other element. It also includes the element being indirectly on top of, adjacent to (e.g., laterally adjacent to, vertically adjacent to), underneath, or near the other element, with other elements present therebetween. In contrast, when an element is referred to as being "directly on" or "directly adjacent to" another element, there are no intervening elements present.

As used herein, the terms "comprising," "including," "having," and grammatical equivalents thereof are inclusive or open-ended terms that do not exclude additional, unrecited elements or method steps, but these terms also include more restrictive terms "consisting of" and "consisting essentially of" and grammatical equivalents thereof. Therefore, a structure described as "comprising," "including," and/or "having" a material may be a structure that, in some embodiments, includes additional material(s) as well and/or a structure that, in some embodiments, does not include any other material(s). Likewise, a composition described as "comprising," "including," and/or "having" an ingredient may be a composition that, in some embodiments, includes additional ingredients as well and/or a composition that, in some embodiments, does not include any other ingredients.

As used herein, the terms "comprises," "comprising," "includes," "including," "has," and/or "having" specify the presence of stated components, chemicals, ingredients, materials, regions, structures, and/or processes, but do not preclude the presence or addition of one or more other components, chemicals, ingredients, materials, regions, structures, and/or processes.

As used herein, the term "may" with respect to a material, structure, region, or method act indicates that such is contemplated for use in implementation of an embodiment of the disclosure and such term is used in preference to the more restrictive term "is" so as to avoid any implication that other, compatible materials, structures, regions, or method acts usable in combination therewith should or must be excluded.

As used herein, "and/or" means and includes any and all combinations of one or more of the associated listed items.

As used herein, the singular forms "a," "an," and "the" are intended to include the plural forms as well, unless the context clearly indicates otherwise.

As used herein, an "(s)" or an "(es)" at the end of a term means and includes the singular form of the term and/or the plural form of the term, unless the context clearly indicates otherwise.

As used herein, the terms "formulated" and "formula" mean and refer to a composition of referenced components, chemicals, or ingredients so as to facilitate a referenced characteristic, property, or effect of the referenced composition in a predetermined way.

As used herein, the terms "configured" and "configuration" mean and refer to a size, shape, material composition, orientation, and arrangement of a referenced material, structure, assembly, or apparatus so as to facilitate a referenced operation or property of the referenced material, structure, assembly, or apparatus in a predetermined way.

The following description provides specific details, such as material types and processing conditions, in order to provide a thorough description of embodiments of the disclosed apparatus (e.g., casings), compositions (e.g., casing materials) and methods. However, a person of ordinary skill in the art will understand that the embodiments of the apparatus, compositions, and methods may be practiced without employing these specific details. Indeed, the embodiments of the apparatus, compositions, and methods may be practiced in conjunction with conventional techniques employed in the industry.

The fabrication processes described herein do not necessarily form a complete process flow for manufacturing the casings, or for using (e.g., shirring, stuffing, cooking, consuming) the casings. The remainders of such process flows are known to those of ordinary skill in the art. Accordingly, only the methods, compositions, and structures necessary to understand embodiments of the present apparatus (e.g., casings), compositions, and methods are described herein.

Unless the context indicates otherwise, the compositions and materials described herein may be formed and used by any suitable technique. Depending on the specific composition and/or material to be formed, the technique for preparing, intermixing, forming, applying, and/or using the compositions and/or materials may be selected by a person of ordinary skill in the art.

According to embodiments of the disclosure, an edible cellulosic casing may comprise and be formed of a casing material having a composition comprising primarily (i.e., at least 50 wt. % of the dry weight of the casing) cellulose (e.g., regenerated cellulose) along with at least one "modifier." The modifier(s) include at least one polysaccharide (e.g., at least one non-cellulose hydrophilic polysaccharide) and, in some embodiments, one or more peptide(s). This casing composition unexpectedly produces a casing strong enough to withstand processing (e.g., shining, stuffing, cooking), while also being easily masticatable (chewable) and consumable.

The casing material may comprise between about 50 wt. % and about 80 wt. % cellulose. Accordingly, the cellulose may constitute a "primary" or "major" component of a "casing composition" (e.g., a composition from which the casing is formed and/or a composition of the final casing).

In at least some embodiments, the cellulose may comprise, consist essentially of, or consist of regenerated cellulose, which may be formed by, e.g., a conventional viscose process, as discussed further below. Regenerated cellulose may provide sufficient strength to the casing so that the casing may be handled during extrusion, shirring, stuffing, and cooking without material failure (e.g., tearing).

The casing composition also comprises at least one modifier. In some embodiments, the casing composition may comprise at least about 20 wt. % modifier(s).

The modifier(s) includes at least one polysaccharide, such as a non-cellulose hydrophilic polysaccharide. In some embodiments, the polysaccharide may comprise, consist essentially of, or consist of one or more homopolysaccharide(s) (e.g., one or more of starch, starch acetate, chitin, chitosan, and/or pectin) and/or one or more heteropolysaccharide or derivative thereof (e.g., one or more of carrageenan, konjac (e.g., konjac mannan, konjac glucomannan (KGM)) xanthan gum, alginic acid, and/or alginate(s)).

The polysaccharide(s) of the modifier may be formulated or otherwise configured to weaken the casing material (e.g., compared to a cellulosic casing material without the polysaccharide(s)) so that the casing material can be bitten into and masticated in the consumer's mouth. Without being bound to any particular theory, it is contemplated that the addition of the polysaccharide(s) (with or without a peptide further included as a modifier of the casing material, as discussed further below) may provide a pathway for moisture and/or enzymes, from the mouth of the consumer, through the casing material so that the moisture and/or enzymes can weaken the casing material when in the consumer's mouth. Accordingly, the inclusion of the polysaccharide(s) in the modifier(s) of the casing material may make the casing material more conducive for being bitten into and for mastication.

The amount of the polysaccharide(s) included in the modifier and in the casing material itself may be tailored to weaken the casing material enough to be masticated but not so weak as to inhibit the casing material from being able to withstand the rigorous processes of, e.g., shining, stuffing, and cooking. For example, the amount of polysaccharide(s) included may be tailored so that the casing will not be overly moisture sensitive.

In some embodiments, the casing composition and the resulting casing material may be formulated so that the casing exhibits a dry tensile strength that is significantly higher (e.g., about 3× or more greater than) the wet tensile strength of the casing. In some such embodiments, the casing material—at least after formation into a casing structure (e.g., after extrusion but prior to stuffing)—may exhibit a dry machine direction (MD) tensile strength of less than about 70 N/mm$^2$, a wet MD tensile strength of less than about 17 N/mm$^2$, a dry transverse direction (TD) tensile strength of less than about 35 N/mm$^2$, and a wet TD tensile strength of less than about 7 N/mm$^2$.

In some embodiments, the casing material may include at least one peptide in addition to the at least one polysaccharide. The peptide may promote adhesion between the material of the casing and the foodstuff (e.g., meat) encased by the casing material. If included in the casing material, the at least one peptide may comprise, consist essentially of, or consist of one or more oligopeptide(s) and/or one or more polypeptides.

In some embodiments, the at least one peptide may be included in the casing material itself. In other embodiments, the at least one peptide may be applied to a surface of the casing material, after it is formed, rather than being included within the body of the casing material itself. In still other embodiments, the at least one peptide may be included in the casing material as well as being applied on a surface of the casing material.

In embodiments in which the at least one peptide is included in the casing material itself (e.g., within a body of the casing material and substantially evenly distributed with the other components of the casing material), the at least one peptide may be described herein as one of the modifier(s) of the casing material. In embodiments in which the at least one peptide is applied to a surface of the casing material, but is not included within the body of the casing material itself, the "modifier(s)" of the casing material may be free or substantially free of peptide at least prior to the application of the at least one peptide.

The at least one peptide, whether included in the modifier(s) for the body of the casing material or whether applied, e.g., as a separate component, to a surface of the casing material, may comprise, consist essentially of, or consist of, for example and without limitation, peptides from non-animal sources (e.g., protein-derived peptides, starch-derived peptides, dextrin).

The presence of the at least one peptide—whether in the casing material itself or on or in a surface of the casing material—may increase adhesion between the casing material and the foodstuff (e.g., meat, ground vegetable(s)) encased by the casing material. Casing materials that do not exhibit sufficient casing-to-foodstuff adhesion can tend to be casing materials that readily separate from the foodstuff during chewing. Separated casing pieces may not readily break up or masticate in the consumer's mouth, which may create the sensation of a foreign (e.g., non-edible) substance being in the mouth. Where such sections of casing material are large enough, the sections may also present choking hazards to the consumer. On the other hand, with sufficient casing-to-foodstuff adhesion—which may be enabled by inclusion of the at least one peptide in the modifier(s) of the casing material or as an additive applied to or on a surface of the casing material—the casing material may not separate from the foodstuff during mastication of the food product.

Without being bound to any particular theory, it is contemplated that the peptide(s)—being chemically similar to a protein—may provide binding sites for foodstuff proteins (e.g., meat proteins or proteins within a meat-substitute product) to adhere to the casing material during the cooking process. With such added binding, the foodstuff adheres more to the casing material, even during chewing, so that the casing material and the foodstuff (e.g., the meat, the vegetables) are consumable together.

In some embodiments, the casing material may include—in addition to the cellulose and the one or more modifier(s)—one or more fillers. The "filler(s)" that may be included may be materials that are not completely or that are only marginally soluble in a caustic solution so that, e.g., the fillers maintain a structural shape exhibiting a desired physical property and/or so that, e.g., the fillers may be at least somewhat colloidally bound in the casing composition (e.g., the casing solution) so as not to be dissolved out by caustic (e.g., acidic) or aqueous components during stages of the casing formation process (e.g., during regeneration of the cellulose and/or washing of the casing material). For example, one or more fillers of the casing material may comprise, consist essentially of, or consist of fiber(s) included to reduce elasticity (e.g., the ability of the casing material to elongate prior to failure, e.g., breaking) and/or to add surface texture to the casing material. Such fiber(s), for the filler(s), may include one or more of wheat bran, ground natural fiber(s), ground flax fiber(s), hemp fiber(s), cotton fiber(s), cellulose fiber(s), cotton linter(s), chitosan, guar seed meal, carob bean meal, and/or microcrystalline cellulose. In such embodiments, these fiber(s) may be included in or be in addition to the cellulose component of the casing material, as described separately in this disclosure.

Alternative or additional filler(s) that may be included in the casing material may comprise, consist essentially of, or consist of xanthan gum or other thickeners. These may be in addition to the polysaccharide(s) of the modifier(s) or may be included in the polysaccharide(s) of the modifier(s). Such filler(s) may increase the viscosity of the casing composition during fabrication of the casing material and/or may increase the density of the casing material of the finished casing.

Alternative or additional filler(s) of the casing material may comprise, consist essentially of, or consist of inorganic fillers, such as one or more of calcium carbonate, pulverulent SiO$_2$. In such embodiments, a calcium carbonate filler material may be used as a whitening agent, and/or calcium carbonate and/or pulverulent SiO$_2$ filler(s) may be used as anticaking agents for other modifiers.

Furthermore, alternative or additional filler(s) of the casing material may comprise, consist essentially of, or consist of one or more flavorants and colorants.

In some embodiments, a composition of a casing material may comprise, consist essentially of, or consist of the following composition:

Example Composition 1

| Component | Percentage (of total weight of these listed components or of the final weight of casing material) |
|---|---|
| Cellulose | about 55 wt. % to about 75 wt. % |
| Non-cellulose hydrophilic polysaccharide | about 16 wt. % to about 40 wt. % |
| Fillers | about 0 wt. % to about 15 wt. % |

In some embodiments, a composition of a casing material may comprise, consist essentially of, or consist of the following composition:

Example Composition 2

| Component | Percentage (of total weight of these listed components or of the final weight of casing material) |
| --- | --- |
| Cellulose | about 55 wt. % to about 75 wt. % |
| Peptide | about 10 wt. % to about 35 wt. % |
| Non-cellulose polysaccharide | about 10 wt. % to about 35 wt. % |
| Fillers | about 0 wt. % to about 15 wt. % |

Either or both of Composition 1 and/or Composition 2, as listed above, may further comprise additional adhesion promoter(s) (e.g., peptide) on a food-contact surface of the casing, which—in embodiments according to Composition 2—may be an amount of peptide in addition to the amount of peptide listed in the table for Composition 2 above.

Either or both of Composition 1 and/or Composition 2, as listed above, may further comprise—e.g., with or without the aforementioned additional adhesion promoter(s) on the food-contact surface—water and one or more plasticizers in the material of the casing (e.g., in the casing composition) or applied to one or more surfaces of the casing material. For example, the casing material may comprise about 10 wt. % to about 25 wt. % water and about 10 wt. % to about 20 wt. % plasticizer(s) (e.g., these weight percentages being based on a final weight of the casing, after inclusion or application of the water and plasticizer(s)). The plasticizer(s) of these or other embodiments of the disclosure, may comprise, consist essentially of, or consist of, for example, glycerol, sorbitol, propylene glycol (PG), and/or the like.

In some embodiments, including those in accordance with Composition 1 and Composition 2, above, the casing material, and therefore the casing as formed, may be free of crosslinking agents (e.g., aldehydes, methylols, epoxides, and enzymes). For example, unlike conventional casing fabrication processes using crosslinking, the casings of embodiments of the present disclosure may be fabricated without crosslinking proteins of the casing material. Therefore, the casing composition, and resulting casing, may be free of even trace amounts of crosslinking agents, which are generally unacceptable for human consumption. The absence of crosslinking agents may, therefore, further enable the cellulosic casing materials of embodiments of this disclosure to be consumable.

Accordingly, the casing compositions of embodiments of the present disclosure enable formation of a casing that is cellulose-based—rather than animal-sourced based—and that is edible (e.g., consumable) while also being strong enough to withstand the rigors of extrusion, shining, stuffing, and cooking processes. These characteristics may be enabled by the surprisingly synergistic effect of combining the cellulose (e.g., regenerated cellulose) with the modifier(s) that include polysaccharide(s) and, in some embodiments, also peptide(s). While casings formed of cellulose—without, e.g., polysaccharide(s) and peptides—are generally too tough to be bitten into and masticated in the mouth; and while casings formed of polysaccharides and/or peptides—without, e.g., cellulose—are generally too structurally weak, lacking a sufficient structural integrity and/or temperature resistance needed to withstand the rigors of the extrusion, shirring, stuffing, and/or cooking processes; casings according to embodiments of the present disclosure, with both cellulose and polysaccharides (and, in some embodiments, peptide(s)) may exhibit sufficient material strength (e.g., due to the cellulose) and sufficient material weakness (e.g., due to the polysaccharides)—in addition to sufficient casing-to-foodstuff adhesion (e.g., due to the peptide(s), in embodiments including such component)—to provide a consumable cellulose-based casing.

Methods for forming casings, according to embodiments of the disclosure, may include forming a cellulose solution (e.g., a viscose solution, a nonderivatized cellulose solution, a solution of cellulose dissolved in an ionic liquid, and/or a solution of cellulose dissolved in a deep eutectic solvent) and forming a separate modifier solution, which solutions may then be mixed together to form a casing composition from which the casing material may be formed.

In at least some embodiments, the solution with the cellulose (e.g., regenerated cellulose) may be formed using a conventional viscose process. A source material for natural cellulose (e.g., wood pulp, cotton linters) may be treated with a caustic solution (e.g., aqueous sodium hydroxide) to activate the cellulose, permit derivatization, and extract certain alkali soluble fractions from the natural cellulose. The resulting alkali cellulose may then be treated with carbon disulfide (e.g., optionally after first shredding and aging the alkali cellulose) to form cellulose xanthate, a cellulose derivative. The cellulose xanthate may then be dissolved in a caustic solution (e.g., a weak caustic solution) to form a viscose solution.

The viscose solution (i.e., the solution comprising regenerated cellulose) may have a composition of a conventional viscose solution, conventionally used in other processes to form other casing materials. Accordingly, a casings manufacturer may be able to make use of already-existing equipment, materials, and processes for at least part of the process to manufacture casings according to embodiments of this disclosure.

In other embodiments, the solution with the cellulose may be formed using a conventional dissolution process. As one such example, natural cellulose (e.g., using any one or more of the aforementioned source material(s) for natural cellulose) may be dissolved using a solvent such as tertiary amine oxide (e.g., N-methyl-morpholine-N-oxide (NMMO)). The cellulose in the resulting cellulose solution is "nonderivatized," meaning the cellulose has not been subjected to covalent bonding with a solvent or reagent but which has been dissolved by association with a solvent or reagent through Van der Waals forces, such as hydrogen bonding.

As another example of forming the cellulose solution, an ionic liquid (IL) may be used to dissolve the cellulose (e.g., natural cellulose). The ionic liquid may comprise, consist essentially of, or consist of a hydrophilic ionic liquid. In these or other embodiments, the ionic liquid may comprise, consist essentially of, or consist of a chloride-containing IL (e.g., 1-butyl-3-methylimidazolium chloride ([BMIM][Cl]); 1-allyl-3-methylimidazolium chloride ([AMIM][Cl]); 1-ethyl-3-methylimidazolium chloride ([EMIM][Cl])); an acetate-containing IL (e.g., 1-butyl-3-methylimidazolium acetate ([BMIM][OAc]); 1-ethyl-3-methylimidazolium acetate ([EMIM][OAc]); 1,5-diazabicyclo[4.3.0]non-5-ene acetate ([DBNH][OAc])); a diethyl phosphate-containing IL (e.g., 1-ethyl-3-methylimidazolium diethyl phosphate ([EMIM][DEP])); and/or a methyl phosphonate-including IL (e.g., 1-ethyl-3-methylimidazolium methyl phosphonate [EMIM][CH$_3$PO$_3$]). Accordingly, a resulting cellulose solution may comprise the cellulose dissolved in at least one IL.

In yet another example of forming the cellulose solution, a deep eutectic solvent (DES) (which may be otherwise referred to in the art as a "low melting solvent mixture") may be used to dissolve the cellulose (e.g., natural cellulose). A DES is a type of solvent mixture—namely, a eutectic mixture—formed by combining a salt and a hydrogen-bond donor (HBD) material. The melting point of the DES has a much lower melting point than the melting points of the individual components. It may be formulated to be a low volatile organic compound (VOC) that does not emit volatile compounds and is nonflammable. Common DESs that may be used to dissolve the cellulose to form the cellulose may include one or more of: a urea-based DES (e.g., a mixture of quaternary ammonium salt with a hydrogen donors such as choline chloride and urea, betaine HCl and urea, and/or betaine and urea); a carboxylic acid-based DES (e.g., a mixture of quaternary ammonium salt with a hydrogen donor such as a carboxylic acid); a mixture of lactic acid and betaine (LA-BE); and a mixture of lactic acid and choline chloride (LA-CC). Accordingly, a resulting cellulose solution may comprise the cellulose dissolved in at least one DES.

The modifier solution may be formed separately from forming the cellulose solution (e.g., the viscose solution, the nonderivatized cellulose-NMMO solution, the cellulose-IL solution, the cellulose-DES solution) (e.g., separately from the cellulose-including solution), whether before, after, or concurrently with forming the cellulose solution. To form the modifier solution, the modifier(s) of the casing material are dissolved or dispersed in an aqueous, caustic solution. Accordingly, the polysaccharides and, in some embodiments, also the peptides (e.g., in embodiments in which the modifier(s) of the casing also include peptide(s)) may be dissolved or otherwise dispersed into solution with an aqueous (e.g., water-based) or aqueous caustic solvent to create the modifier solution. In embodiments in which the casing material is to further include filler(s) and/or plasticizers, the filler(s) and/or plasticizers may also be included in the modifier solution. Accordingly, the water in the aqueous or aqueous caustic solvent may contribute to the final amount of water (e.g., moisture) within the casing material.

In some embodiments, the polysaccharide(s) may be dissolved into the aqueous or aqueous caustic solvent before other components of the modifier solution, to promote full dissolution of the polysaccharide(s) in the modifier solution. In embodiments in which the modifier(s) of the casing material include peptide(s), the peptide(s) may, e.g., be dissolved into the modifier solution after, before, or concurrently with dissolving the polysaccharide(s). The peptide(s)—being short-chain compounds (rather than long-chain protein compounds)—may be sufficiently able to dissolve into the aqueous or aqueous caustic solution. Accordingly, the modifier solution may be formed with the polysaccharide(s)—and, in some embodiments, the peptide(s), the fillers, the plasticizers, and/or other non-cellulose components of the casing material—sufficiently dissolved and distributed in the modifier solution.

After separately forming the modifier solution at a desired concentration of the polysaccharides (and, in some embodiments, other modifier(s) and/or additives), a select amount of the modifier solution may be added into and dissolved into a select amount of the cellulose solution (e.g., the viscose solution, the nonderivatized cellulose-NMMO solution, the cellulose-IL solution, and/or the cellulose-DES solution). The separate formation of the cellulose solution and the modifier solution, before intermixing, may enhance dispersion of the various macromolecules as well as accommodate precision in the formulation of the combined composition (e.g., the formulation of the casing material). That is, polysaccharides are generally challenging to fully dissolve into solution and may not evenly dissolve and disperse if directly added into the cellulose solution. By first substantially dissolving or otherwise dispersing the polysaccharides (and other modifier(s) and/or additives, if any) into the modifier solution, these components of the casing material may already be suitably solubilized at the time of their intermixing into the cellulose solution (e.g., into the viscose solution, into the nonderivatized cellulose-NMMO solution, into the cellulose-IL solution, into the cellulose-DES solution), promoting even intermixing of the modifier(s) (and, e.g., other additives, if any) in the cellulose solution. This combination of the two solutions forms a casing composition from which the casing material may be formed, as described below.

In other embodiments, the cellulose solution may be formed, as described above, and the modifier(s) (e.g., the polysaccharide(s), the peptide(s) (if any), and/or any other modifier(s)) may be added directly into the cellulose solution without first forming a modifier solution. In such embodiments, mixing and agitation of the mixture may be performed for a sufficiently long enough time to promote the polysaccharides and any other modifier(s) from being solubilized and dispersed in the cellulose solution, forming a casing composition.

Once the casing composition has been formed, the resulting compound solution may be extruded to form the casing (e.g., as a tubular film (e.g., a seamless tube) or as a film (e.g., a flat sheet)). For example, the casing composition may be extruded through a die defining a cylindrical shape or through a die defining a flat shape. Regardless of die-defined shape, the casing composition may be extruded into one or more baths. For example, in embodiments in which the cellulose solution was formed as a viscose solution, the casing composition may be extruded into coagulation and regenerating baths comprising mineral acid(s) (e.g., sulfuric acid with salts). In the acidic baths, the cellulose xanthate (e.g., viscose) of the casing composition may be hydrolyzed back to a pure form of cellulose. Therefore, the casing composition—at least after extrusion—comprises regenerated cellulose. As another example, in embodiments in which the cellulose solution was formed as a nonderivatized cellulose solution (e.g., using NMMO), a cellulose-IL solution, and/or a cellulose-DES solution, the casing composition may be extruded into a water bath wherein the cellulose precipitates to form a gel substance that may then be treated with water, a polyhydric alcohol (e.g., glycerin) or other water-soluble softening agent (e.g., polyalkylene oxide or a polyalkylene glycol).

Whether the resulting, extruded and treated casing material was formed using a cellulose solution formed as a viscose solution, as a nonderivatized cellulose-NMMO solution, as a cellulose-IL solution, and/or as a cellulose-DES solution, the formed casing may then be washed out (e.g., with glycerin or another humectant) and subsequently dried. The drying may remove moisture so that the moisture level of the casing (e.g., post-drying, pre-shirring and/or pre-stuffing) is less than about 50 wt. % (the weight percentage being of the dry weight of the casing). In some embodiments, the drying may result in the casing having a moisture content of less than about 30 wt. % (again, based on the dry weight of the casing).

In embodiments in which the casing was formed as a seamless tube (e.g., extruded via the die for forming the cylindrical shape), the casing may—after the aforementioned drying—be shined. Shirring is a process wherein a casing is compressed longitudinally to form a "stick" of the shined casing. In some embodiments, as the casing is being shined, a "shirring" solution may be applied to one or more surface(s) of the casing. For example, shirring solution comprising an adhesion promoter may be applied to an internal surface of a tubular casing during shirring (e.g., applied, such as by spraying, to the food-contact surface of the casing just prior to the material of the casing being compressed). The adhesion promoter may include any of the adhesion-promoting compounds described above, such as one or more peptides and/or one or more proteins, starches, dextrin, and/or other adhesion promoter. Accordingly, the shining solution may be formulated or otherwise configured to enhance adhesion between the casing and the foodstuff (e.g., meat product, vegetable-based product) to be encased within the casing.

In embodiments in which the casing was formed as a flat film (e.g., a flat sheet), such as by extrusion via a die for forming a flat shape, the casing may not be shined prior to stuffing. Rather, the flat film casing may be formed into a tube and sealed (e.g., to form a sealed tubular casing) in a continuous process with stuffing. The adhesion promoter(s) may be applied, e.g., to a food-contact surface of such flat film casing before or while forming the flat film into the tubular shape for stuffing.

In other embodiments, the casing may not be formed by extrusion, but may be formed by casting the casing composition onto a webbing (e.g., a belt) to form the casing material in a flat film configuration. The flat film may then be dried and removed from the webbing (e.g., the belt) prior to stuffing. In such embodiments, as with the casing formed as a flat film by extrusion, the cast flat film casing may be formed into a tubular shape and sealed (e.g., to form a sealed tubular casing) in conjunction with a stuffing process and with or without the adhesion promoter(s) applied, e.g., to a food-contact surface thereof before or while forming the flat film into the tubular shape for stuffing.

Whether the casing is initially formed as a seamless tube or whether initially formed as a flat film and then sealed into a tubular shape, the casing may then be stuffed using conventional equipment. For example, casings formed as seamless tubes and shined may then be deshirred while being stuffed with a desired foodstuff (e.g., meat or meat-substitute product for sausage(s) or hotdogs). As another example, casings formed as flat sheets initially may be formed into a tubular shape, sealed, and stuffed with the desired foodstuff (e.g., using conventional "form and fill" equipment).

Alternatively, casing formed as flat films may be used without forming into a tubular shape. For example, flat film casings—according to embodiments of the disclosure—may be used as a foodstuff wrap (e.g., for ham, for bacon), with or without application of adhesion promoter(s) (e.g., one or more peptides or other adhesion promoters) on a food-contact surface of the casing film.

After inclusion of the foodstuff (or other material for ingestion) within the casing, the encased food product may then be cooked and consumed, with the casing remaining on the food product during these processes. Therefore, the cellulose-based casing of embodiments of the disclosure may be consumed as part of the food product (e.g., as part of a sausage, hotdog, ham, bacon).

Accordingly, by the methods of at least some embodiments of the disclosure, casing manufacturers that already make use of a conventional viscose process may be able to continue to make use of that process, the systems and ingredients therefor, in a process for manufacturing edible cellulose-based casings.

Moreover, at least in embodiments in which the casing is formed, from the casing composition, as a seamless tube, the casing may be formed using a continuous process without the need of a secondary seaming stage. Accordingly, the casing may be formed in an efficient, fast, and cost-effective manner. Furthermore, forming the casing as a seamless tube may avoid physical vulnerabilities in the casing structure. That is, a seamless tube casing may avoid potential weak points of seam-including tubular casing structures. Such seams—which may be introduced when an adhesive (e.g., a glue) is used to form a seam or when a seam is otherwise formed without an adhesive—may be vulnerable to tears or breakage during shining, stuffing, and/or cooking processes. On the other hand, a tube free of a seam may be free of such potential points of failure and may exhibit suitable strength to survive such rigorous processes as shining, stuffing, and cooking. Thus, the casings formed, from the casing composition(s) described above, in the form of seamless tubular casings may be more mechanically robust than seamed tubular casings and, therefore, may be more conducive for use in conventional, high-speed, automated stuffing and cooking processes.

With reference to FIGS. 1 through 5, schematically illustrated are casings and casing materials that may be formed in accordance with embodiments of the disclosure. The illustrations presented herein are not meant to be actual views of any particular article, structure, material, or portion or region thereof, but are merely idealized or schematic representations that are employed to describe embodiments of the disclosure.

Embodiments described herein with reference to schematic and/or cross-sectional illustrations are not to be construed as limited to the particular shapes or structures as illustrated but may include deviations in shapes that result, for example, from manufacturing techniques or alternate conditions. For example, structures illustrated to be flat may or may not be wholly planar and structures illustrated to be curved may or may include some regions that are planar. Thus, the materials, structures, and regions illustrated in the figures are schematic in nature and their illustrated shapes are not intended to illustrate the precise shape of a material, structure, or region and do not limit the scope of the present claims.

In referring to the drawings, like numerals refer to like components throughout. The drawings are not necessarily drawn to scale.

With reference to FIG. 1, illustrated is a tubular casing 100, which may be formed using any of the casing composition(s) described above, including the cellulose (e.g., regenerated cellulose) and at least one modifier that includes a polysaccharide and, in some embodiments, also a peptide and/or other additives (e.g., fillers). The tubular casing 100 includes a first surface 102 (e.g., an inner surface) and a second surface 104 (e.g., an outer surface). In embodiments in which the tubular casing 100 is formed as a seamless tube (e.g., by extrusion through a die configured for forming a cylindrical shape), neither the first surface 102 nor the second surface 104 may include a seam. In other embodiments, such as those in which the casing material is formed first as a flat sheet (e.g., as a flat film), the tubular casing 100 may include a seam 106 joining two edges of the film into a cylindrical shape. Whether with or without the seam 106, the first surface 102 may provide a food-contact surface 108 of the tubular casing 100 once the tubular casing 100 is used to encase the desired foodstuff (e.g., meat or meat-substitute product).

The tubular casing 100 of FIG. 1 may represent the tubular casing 100 before or after shirring. It may also represent the tubular casing 100 after stuffing and cooking, though a foodstuff would be further illustrated in the tubular casing 100, on the food-contact surface 108 (e.g., the first surface 102).

With reference to FIG. 2, illustrated is a flat film casing 200, which may be formed using any of the casing composition(s) described above. The flat film casing 200 includes the first surface 102 and the second surface 104. At least one of the first surface 102 and the second surface 104 may be the food-contact surface 108. For example, the first surface 102 may be the food-contact surface 108 once the flat film casing 200 is formed and stuffed or otherwise wrapped around the desired foodstuff.

Though FIG. 2 illustrates the food-contact surface 108 as a downward-facing surface (e.g., the first surface 102), the disclosure is not limited thereto. In other embodiments, the food-contact surface 108 may be an upward-facing surface (e.g., the second surface 104).

The flat film casing 200 of FIG. 2 may be rolled and seamed along joined edges of the film to form the flat film casing 200 into the tubular casing 100 of FIG. 1, and including the seam 106 (e.g., along the joined edges), during or before stuffing, e.g., by use of form-and-fill equipment.

FIG. 3 schematically illustrates, in enlarged, elevational cross-section, the casing material of any of the tubular casing 100 of FIG. 1 and/or the flat film casing 200 of FIG. 2. In some embodiments, a casing material 302 may be formed as a continuous region of material extending from the first surface 102 to the second surface 104. Thus, the cellulose, the modifier(s) (e.g., including the polysaccharide (s)), and any other included casing-material component, such as peptide(s), fillers, plasticizers, etc., (if any) may be substantially evenly distributed throughout the casing material 302.

FIG. 4 schematically illustrates, in enlarged, elevational cross-section, the casing material 302 of FIG. 3 (and, therefore, of tubular casing 100 (FIG. 1) and/or of flat film casing 200 (FIG. 2)) with the further inclusion of an adhesion promoter 402 along the food-contact surface 108. The adhesion promoter 402 (e.g., comprising, consisting essentially of, or consisting of one or more of peptide(s), protein(s), starch(es), dextrin, or other adhesion promoter material) may be applied on or in the food-contact surface 108 as described above, such as during shirring of the tubular casing 100 or during formation and filling of the flat film casing 200.

FIG. 5 schematically illustrates, in enlarged cross-section, box 304 of the casing material 302 (and therefore, of the tubular casing 100 (FIG. 1) and/or of the flat film casing 200 (FIG. 2)). Without being bound to any particular theory, it is contemplated that the cellulose, the polysaccharide(s), and the peptide(s) (if included in the casing composition) may form a heterogeneous material structure in which the cellulose, the polysaccharide(s), and the peptide(s) (if any) provide distinguishable regions (e.g., phases) in the wall structure of the casing material 302. For example, it is contemplated that the cellulose (e.g., regenerated cellulose) of the casing material 302 may provide a cellulose matrix 502 in which may be distributed modifier phases 504 with the polysaccharide(s) and, if any, the peptide(s) of the casing material 302. Any filler(s) and/or plasticizers in the casing material 302 may also be included in the modifier phases 504. The modifier phases 504 may provide pathways 506 through the cellulose matrix 502 along which moisture and/or enzymes, present in the mouth of the consumer, may interact with the polysaccharide(s) of the modifier phases 504 of the casing material 302 to weaken the casing material 302. That is, the polysaccharide(s) in the modifier phases

504 may become significantly weakened as they become saturated with moisture (e.g., from saliva), thereby significantly weakening the casing material 302, which enables the consumer to break apart the casing material 302 during chewing. As the moisture weakens the casing material 302 to enable chewing the peptide(s) (if any) of the modifier phases 504 and/or of the adhesion promoter 402 (FIG. 4) may promote continued adhesion between the casing material 302 and the foodstuff. In other words, as the food product (e.g., sausage, hotdog, or other encased food product) is chewed, the casing material 302 and the foodstuff remain adhered to one another along the food-contact surface 108 (FIG. 1 through FIG. 4), avoiding a bitten-off piece from separated into one amount of, e.g., meat or meat byproduct and another amount of casing material (e.g., a band of material). After all, were the casing material 302 to separate from the foodstuff in the mouth of the consumer, the separation may create an unappealing sensation of a foreign object (e.g., a band), which may pose a choking hazard.

Accordingly, casings—in accordance with embodiments of the disclosure—may be formulated and fabricated to enable the casing to maintain its structural integrity during shirring, during stuffing (e.g., stuffing at high pressures, such as of about 200 mmHg pressure (about 27 kPa)), and during cooking (e.g., during cooking at high temperatures, such as to achieve a minimum food-core temperature of about 180° F. (about 85° C.) with an outside temperature of about 212° F. (about 100° C.)). After cooking, the cooked, encased foodstuff product (e.g., sausage, hotdog, or the like) may exhibit a shape of conventionally encased foodstuff product and may be chewed and consumed—casing and all—though cellulose-based. Thus, embodiments of the disclosure provide a casing material that is cellulose-based, and which may be wholly free of animal-derived products, and yet is strong enough to withstand rigorous processing and formulated to be masticated and consumed.

EXAMPLES

Example drawn-down sample casings were produced from combined viscose (cellulose) and carrageenan solutions, the latter constituting a modifier solution in which carrageenan was the selected polysaccharide modifier. From the example casings, it was demonstrated that these casings may be readily consumed with adequate bite characteristics and adequate ability to be broken down by mastication (chewing by the consumer).

Modifier solutions were produced of carrageenan in a caustic solution, which modifier solutions were then mixed with viscose (e.g., a cellulose solution) to form samples of casing compositions at various amounts of the carrageenan and the viscose. The carrageenan used in the modifier solutions was 5-100F Iota, available from Ingredient Solutions, Inc., of Waldo, Me., USA. The sample casing compositions were then drawn down onto glass sheets (e.g., in the form of flat sheets), floated off the glass, and placed into an acid solution to regenerate the cellulose of the casing compositions. After regeneration, the acid was washed out from the drawdowns, and the drawdowns were placed in a glycerin/water bath. The drawdowns were subsequently dried in an oven to form flat film casings (e.g., like the flat film casing 200 of FIG. 2). The samples of the casing compositions, as examined, were as follows:

| Sample # | % Carrageenan (S-100F) in Solution | % Solution to Viscose | % Carrageenan to Total Solids |
|---|---|---|---|
| SA103-16-17 | 10.0% | 15.0% | 18.6% |
| SA103-16-18 | 10.0% | 10.0% | 12.6% |
| SA103-16-19 | 7.7% | 10.0% | 10.0% |

The flat film casings were then tested for mastication after both 30 seconds and 60 seconds of mastication. Observations from these tests were as follows:

| Sample # | % Carrageenan of Dry Solids | 30 sec. Mastication | 60 sec. Mastication |
|---|---|---|---|
| Control # 4/ SA103-16-10 100% Cellulose | 0 | Casing still intact | Casing still intact |
| SA103-16-17 | 10 | Casing still intact | Reduced in size |
| SA103-16-18 | 12.6 | Casing reduced in size | Casing reduced in size, swallowed most |
| SA103-16-19 | 18.6 | Casing reduced in size | Reduced in size, easy to swallow |

Further casing samples were fabricated and tested. These additional samples included use of a peptide along with the cellulose and the polysaccharide modifier(s). More particularly, a modifier solution was prepared to include a peptide (e.g., as an adhesion promoter of the modifier solution), cellulose fiber (e.g., as a filler material of the modifier solution), and xanthan gum (e.g., as a polysaccharide of the modifier solution) mixed into a caustic solution. The modifier solution was then injected into a viscose solution to form a casing composition that was then subjected to extrusion via an extrusion nozzle. The viscose was then regenerated, sulfuric acid washed out, and a plasticizer (glycerin) and water added. The resulting casing has the following formulation, on a dry basis:

| Component | Dry Casing Composition (%) |
|---|---|
| Cellulose (Regenerated) | 70 |
| NAPC XBB (Peptide) | 16.65 |
| Fiber BWW40 | 10.74 |
| Xanthan Gum | 2.61 |
| | 100 |

In the foregoing table, "BWW40" represents a powdered cellulose, "NAPC XBB" represents collagen hydrolysate (e.g., as the peptide of the casing composition). In these or other embodiments of the disclosure, the collagen hydrolysate (e.g., a hydrolyzed collagen) may be otherwise replaced with another form of hydrolyzed peptide to provide the peptide of the casing composition. Such other form of hydrolyzed peptide may include a hydrolyzed peptide derived from one or more of vegetable protein(s)/peptide(s) and/or animal protein(s)/peptide(s) (e.g., fish protein(s)/peptide(s), such as fish gelatin; milk protein(s)/peptide(s)).

The formed casings were hand stuffed with meat, using a meat stuff available from Handtmann Inc., of Lake Forest, Ill., USA. The food product was cooked in an oven available from Alkar Systems of Lodi, Wis., USA. After cooking, the cooked meat products, including the casing material, could be readily masticated.

In any of the aforementioned examples, an additional adhesion promoter (e.g., the adhesion promoter 402 of FIG.

4) may be applied to the food-contact surface 108 (FIG. 1 through FIG. 4) of the casing (e.g., during shining) to enhance casing-to-foodstuff adhesion, as discussed above.

While the disclosed compositions, articles, and methods are susceptible to various modifications and alternative forms in implementation thereof, specific embodiments have been discussed above and/or shown by way of example in the drawings and have been described in detail herein. However, it should be understood that the present invention is not intended to be limited to the particular forms disclosed. Rather, the present invention encompasses all modifications, combinations, equivalents, variations, and alternatives falling within the scope of the present disclosure as defined by the following appended claims and their legal equivalents.

What is claimed is:

1. An edible cellulosic casing, comprising:
cellulose; and
at least one modifier comprising at least one non-cellulose hydrophilic polysaccharide, the at least one modifier substantially evenly distributed with the cellulose throughout a casing material of the edible cellulosic casing,
the casing material having a heterogeneous material structure in which the cellulose and the at least one modifier comprising the at least one non-cellulose hydrophilic polysaccharide provide distinguishable phases from one another in the heterogeneous material structure,
wherein the edible cellulosic casing comprises, by dry weight thereof:
the cellulose in a range from about 55 wt. % to about 75 wt. % of the edible cellulosic casing;
the at least one non-cellulose hydrophilic polysaccharide, of the at least one modifier, in a range from about 10 wt. % to about 35 wt. % of the edible cellulosic casing;
at least one peptide, of the at least one modifier, in a range from about 10 wt. % to about 35 wt. % of the edible cellulosic casing; and
at least one filler material in a range from about 0 wt. % to about 15 wt. % of the edible cellulosic casing; and
wherein the edible cellulosic casing is free of aldehydes, methylols, epoxides, and enzymes.

2. The edible cellulosic casing of claim 1, wherein the cellulose comprises regenerated cellulose.

3. The edible cellulosic casing of claim 1, wherein the at least one polysaccharide is selected from the group consisting of starch, starch acetate, chitin, chitosan, pectin, carrageenan, konjac, xanthan gum, alginic acid, and alginate.

4. The edible cellulosic casing of claim 1, wherein the at least one non-cellulose hydrophilic polysaccharide comprises carrageenan.

5. The edible cellulosic casing of claim 1, wherein the casing is in a seamless tube form or in a flat film form.

6. The edible cellulosic casing of claim 1, further comprising at least one adhesion promoter on a food-contact surface of the edible cellulosic casing.

7. The edible cellulosic casing of claim 6, wherein the at least one adhesion promoter comprises at least one peptide.

8. The edible cellulosic casing of claim 6, wherein the at least one adhesion promoter comprises at least one of starch or dextrin.

9. The edible cellulosic casing of claim 1, wherein the edible cellulosic casing is free of animal-derived components.

10. A method for forming the edible cellulosic casing of claim 1, the method comprising:

forming a solution comprising the cellulose;

forming a modifier solution comprising, dissolved in the modifier solution, the at least one non-cellulose hydrophilic polysaccharide and the at least one peptide;

mixing the modifier solution into the solution comprising the cellulose to form a mixture; and forming the casing material of claim 1 from the mixture.

11. The method of claim 10, wherein:

forming the solution comprising the cellulose comprises forming a viscose solution comprising the cellulose;

forming the casing material comprises:

exposing the mixture to at least one acid to form a casing composition comprising a regenerated cellulose derived from the cellulose of the viscose solution; and the method further comprises:

extruding the casing composition to form a seamless tube casing comprising the casing material; and shirring the seamless tube casing while applying at least one adhesion promoter on a food-contact surface of the seamless tube casing.

12. The method of claim 10, wherein:

forming the solution comprising the cellulose comprises dissolving natural cellulose in at least one of N-methylmorpholine-N-oxide (NMMO), an ionic liquid (IL), or a deep eutectic solvent (DES); and the method further comprises extruding the mixture to form an edible casing comprising the casing material, the cellulose of the casing material being derived from the natural cellulose.

13. The edible cellulosic casing of claim 1, wherein the at least one peptide in the range from about 10 wt. % to about 35 wt. % of the edible cellulosic casing comprises at least one oligopeptide in the range from about 10 wt. % to about 35 wt. % of the edible cellulosic casing.

14. The edible cellulosic casing of claim 1, wherein the heterogeneous material structure comprises cellulose-rich regions and modifier-rich regions that are microscopically distinguishable from one another.

* * * * *